(12) United States Patent
Hurr (10) Patent No.: US 11,577,690 B1
(45) Date of Patent: Feb. 14, 2023

(54) SYSTEMS AND METHODS FOR CONTROLLING A VEHICLE SECURITY SYSTEM

(71) Applicant: Ford Global Technologies, LLC, Dearborn, MI (US)

(72) Inventor: Simon John William Hurr, Grays (GB)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/397,433

(22) Filed: Aug. 9, 2021

(51) Int. Cl.
| | |
|---|---|
| *B60R 25/10* | (2013.01) |
| *B60R 25/01* | (2013.01) |
| *B60R 25/30* | (2013.01) |
| *B60R 25/24* | (2013.01) |
| *B60R 25/31* | (2013.01) |

(52) U.S. Cl.
CPC .......... *B60R 25/1003* (2013.01); *B60R 25/01* (2013.01); *B60R 25/24* (2013.01); *B60R 25/307* (2013.01); *B60R 25/31* (2013.01)

(58) Field of Classification Search
CPC ..... B60R 25/1003; B60R 25/01; B60R 25/24; B60R 25/307; B60R 25/31
See application file for complete search history.

(56) References Cited

U.S. PATENT DOCUMENTS

| | | | |
|---|---|---|---|
| 5,319,698 A | 6/1994 | Glidewell et al. | |
| 5,510,765 A * | 4/1996 | Madau | B60R 25/1004 340/552 |
| 8,217,774 B2 * | 7/2012 | Elias | E05B 77/28 340/5.72 |
| 2008/0258867 A1 * | 10/2008 | Harris | E05B 47/026 280/5.2 |
| 2015/0173496 A1 * | 6/2015 | Ely | B60N 3/008 5/118 |
| 2016/0127473 A1 * | 5/2016 | Khan | H04W 52/0229 455/66.1 |
| 2016/0328931 A1 * | 11/2016 | Green | G08B 15/00 |
| 2019/0390485 A1 * | 12/2019 | Konchan | E05B 77/28 |

FOREIGN PATENT DOCUMENTS

WO  WO 2020224399  11/2020

\* cited by examiner

*Primary Examiner* — Thomas D Alunkal
(74) *Attorney, Agent, or Firm* — Haley Guiliano LLP (57) ABSTRACT

The present disclosure relates to controlling a vehicle security system for a vehicle configured for habitation. More particularly, but not exclusively, the present disclosure relates to selectively activating one of a first security mode and a second security mode, wherein the first security mode is configured to allow the vehicle to be used as a domicile.

18 Claims, 10 Drawing Sheets

Fig. 1

Feature by Feature Comparison

| | Full Guard Mode | Reduced Guard Mode | Habitation Mode |
|---|---|---|---|
| Double lock possible? | Yes | Yes | No |
| Alarm perimeter protection upon locking? | Yes | Yes | Yes |
| Alarm interior protection upon locking? | Yes | No | No |
| Alarm inclination detection upon locking? | Yes | No | No |
| Camping specific features enabled? | No | No | Yes |

| Status pre lock request is unlocked or in central lock. Vehicle in full guard. Double lock requested. User has not requested manual override for unattended vehicle | | | | | | | | | |
|---|---|---|---|---|---|---|---|---|---|
| | Logic checks – safest conditions always takes precedence | | | Enabled / disabled by solenoids or electrical contactors | | | | | |
| Sensor status / owner interaction | Alarm defaults to | Locking defaults to | Security mode set to | Gas appliances | Pumped water | Heating / hot water | Mains sockets | Fridge | Mislock chirps? | Push message via app |
| Gas line pressure – bottle ON | Full guard | Double lock | Full guard | Disabled | Disabled | Mains heating only | Enabled | Enabled on 240v only | No | Gas & water has been disabled |
| Gas line pressure – bottle OFF | Full guard | Double lock | Full guard | Disabled | Disabled | Mains heating only | Enabled | Enabled on 240v only | No | Water pump has been disabled |
| Occupancy sensing – beings detected | Reduced guard | Central lock only | Habitation | Enabled | Enabled | Enabled | Enabled | Enabled on 240v or gas | Yes | Occupancy detected, habitation mode engaged |
| Occupancy sensing – no beings detected | Full guard | Double lock | Full guard | Disabled | Disabled | Mains heating only | Enabled | Enabled on 240v only | No | None |
| Mains hookup is connected | Full guard | Central lock only | Habitation | Disabled | Disabled | Mains heating only | Enabled | Enabled on 240v only | Yes | Manual override needed to double lock |

| Status pre lock request is unlocked or in central lock. Vehicle in reduced guard. Double lock requested. User has not requested manual override for unattended vehicle | | | | | | | | | |
|---|---|---|---|---|---|---|---|---|---|
| | Logic checks – safest conditions always takes precedence | | | Enabled / disabled by solenoids or electrical contactors | | | | | |
| Sensor status / owner interaction | Alarm defaults to | Locking defaults to | Security mode set to | Gas appliances | Pumped water | Heating / hot water | Mains sockets | Fridge | Mislock chirps? | Push message via app |
| Gas line pressure – bottle ON | Reduced guard | Double lock | Reduced guard | Disabled | Disabled | Mains heating only | Enabled | Enabled on 240v only | No | Gas & water has been disabled |
| Gas line pressure – bottle OFF | Reduced guard | Double lock | Reduced guard | Disabled | Enabled | Mains heating only | Enabled | Enabled on gas, 12v or mains | No | Water pump has been disabled |
| Occupancy sensing – beings detected | Reduced guard | Central lock only | Habitation | Enabled | Enabled | Enabled | Enabled | Enabled on 240v or gas | Yes | Occupancy detected, habitation mode engaged |
| Occupancy sensing – no beings detected | Reduced guard | Double lock | Reduced guard | Disabled | Disabled | Mains heating only | Enabled | Enabled on 240v only | No | None |
| Mains hookups connected | Reduced guard | Central lock only | Habitation | Disabled | Disabled | Mains heating only | Enabled | Enabled on 240v only | Yes | Manual override needed to double lock |

| Status pre lock request is unlocked or central locked. Vehicle in habitation mode. Double lock requested. User has not requested manual override for unattended vehicle | | | | | | | | | |
|---|---|---|---|---|---|---|---|---|---|
| | Logic checks – safest conditions always takes precedence | | | Enabled / disabled by solenoids or electrical contactors | | | | | |
| Sensor status / owner interaction | Alarm defaults to | Locking defaults to | Security mode set to | Gas appliances | Pumped water | Heating / hot water | Mains sockets | Fridge | Mislock chirps? | Push message via app |
| All conditions | Reduced guard | Central lock only | Habitation | Enabled | Enabled | Enabled | Enabled | Enabled on gas, 12v or mains | Yes | Double lock inhibited for safety in habitation mode |

Fig. 6C

Status pre lock request is unlocked or in central lock. Vehicle in full guard. Double lock requested. User has requested manual override for unattended vehicle

| Sensor status / owner interaction | logic checks – safest condition always takes precedence | | | Enabled / disabled by subsystem or electrical contactors | | | | | Mislock chimes? | Push message via app |
|---|---|---|---|---|---|---|---|---|---|---|
| | Alarm defaults to | Locking defaults to | Security mode set to | Gas appliances | Pumped water | Heating / hot water | Mains sockets | Fridge | | |
| Gas line pressure – bottle ON | Full guard | Double lock | Full guard | Disabled | Disabled | Mains heating only | Enabled | Enabled on 240v only | No | Gas & water has been disabled |
| Gas line pressure – bottle OFF | Full guard | Double lock | Full guard | Disabled | Disabled | Mains heating only | Enabled | Enabled on 240v only | No | Gas & water has been disabled |
| Occupancy sensing – beings detected | Reduced guard | Central lock only | Habitation | Enabled | Enabled | Mains heating only | Enabled | Enabled on 240v, or gas | Yes | Occupants detected, habitation mode engaged |
| Occupancy sensing – no beings detected | Full guard | Double lock | Full guard | Disabled | Disabled | Mains heating only | Enabled | Enabled on 240v only | No | Gas & water has been disabled |
| Mains cable hookup is connected | Full guard | Double lock | Full guard | Disabled | Disabled | Mains heating only | Enabled | Enabled on 240v only | No | Gas & water has been disabled |

Status pre lock request is unlocked or in central lock. Vehicle in reduced guard. Double lock requested. User has requested manual override for unattended vehicle

| Sensor status / owner interaction | logic checks – safest condition always takes precedence | | | Enabled / disabled by subsystem or electrical contactors | | | | | Mislock chimes? | Push message via app |
|---|---|---|---|---|---|---|---|---|---|---|
| | Alarm defaults to | Locking defaults to | Security mode set to | Gas appliances | Pumped water | Heating / hot water | Mains sockets | Fridge | | |
| Gas line pressure – bottle ON | Reduced guard | Double lock | Reduced guard | Disabled | Disabled | Mains heating only | Enabled | Enabled on 240v only | No | Gas & water has been disabled |
| Gas line pressure – bottle OFF | Reduced guard | Double lock | Reduced guard | Disabled | Disabled | Mains heating only | Enabled | Enabled on 240v only | No | Water pump has been disabled |
| Occupancy sensing – beings detected | Reduced guard | Central lock only | Habitation | Enabled | Enabled | Mains heating only | Enabled | Enabled on gas, 12v or mains | Yes | Occupants detected, habitation mode engaged |
| Occupancy sensing – no beings detected | Reduced guard | Double lock | Reduced guard | Disabled | Disabled | Mains heating only | Enabled | Enabled on 240v only | No | None |
| Mains hookup is connected | Reduced guard | Central lock only | Habitation | Disabled | Disabled | Mains heating only | Enabled | Enabled on 240v only | Yes | Manual override needed to double lock |

Status pre lock request is unlocked or central locked. Vehicle in habitation mode. Double lock requested. User has requested manual override for unattended vehicle

| Sensor status / owner interaction | logic checks – safest condition always takes precedence | | | Enabled / disabled by subsystem or electrical contactors | | | | | Mislock chimes? | Push message via app |
|---|---|---|---|---|---|---|---|---|---|---|
| | Alarm defaults to | Locking defaults to | Security mode set to | Gas appliances | Pumped water | Heating / hot water | Mains sockets | Fridge | | |
| Occupancy sensing – beings detected | Reduced guard | Central lock only | Habitation | Enabled | Enabled | Enabled | Enabled | Enabled on gas, 12v or mains | Yes | Override ignored, persons within vehicle |
| Occupancy sensing – no beings detected | Full guard | Double lock | Full guard | Disabled | Disabled | Mains heating only | Enabled | Enabled on 240v only | No | Gas & water has been disabled |

Fig. 6D

Status: vehicle is unlocked or central locked. Vehicle in any mode. Engine crank / torque to wheels requested.

| Sensor status / owner interaction | logic checks – safest condition always takes | | | Enabled / disabled by solenoids or electrical contactors | | | | | | |
|---|---|---|---|---|---|---|---|---|---|---|
| | Alarm defaults to | Locking defaults to | Security mode set to | Gas appliances | Pumped water | Heating / hot water | Mains sockets | Fridge | Unlock things? | Push message via app |
| Vehicle in Habitation mode, ignition on requested | off if key detected | Unlock | none – drive mode | Disabled | Disabled | Disabled | Pro power onboard only | Enabled on 12v only | N/A | None |
| Vehicle in Habitation with parental lock mode | Reduced guard off if key detected | Central lock only | Habitation mode crank inhibited / no torque | Enabled | Enabled | Enabled | Enabled | Enabled on gas, 12v or mains | Yes | Please override parental lock (PIN, pattern etc.) |
| 240v mains still connected | | Unlock | | Disabled | Disabled | Disabled | Pro power onboard only | Enabled on 12v only | Yes | Crank / torque inhibited due to 240v mains lead still connected |

Status: vehicle is double locked. Vehicle in any mode. Engine crank / torque to wheels requested.

| Sensor status / owner interaction | logic checks – safest condition always takes | | | Enabled / disabled by solenoids or electrical contactors | | | | | | |
|---|---|---|---|---|---|---|---|---|---|---|
| | Alarm defaults to | Locking defaults to | Security mode set to | Gas appliances | Pumped water | Heating / hot water | Mains sockets | Fridge | Unlock things? | Push message via app |
| Ignition on requested | off if key detected | Central lock only | none – drive mode | Disabled | Disabled | Disabled | Pro power onboard only | Enabled on 12v only | N/A | None |
| Interior movement detected, no key detected | Triggered off if key detected | Double lock | Full guard crank inhibited / no torque | Disabled | Disabled | Disabled | Disabled | Enabled on 240v only | N/A | Alarm triggered via interior motion sensors |
| 240v mains still connected | | Unlock | | Disabled | Disabled | Disabled | Pro power onboard only | Enabled on 12v only | Yes | Crank / torque inhibited due to 240v mains lead connected |

SYSTEMS AND METHODS FOR CONTROLLING A VEHICLE SECURITY SYSTEM

BACKGROUND

The present disclosure relates to controlling a vehicle security system for a vehicle configured for habitation. More particularly, but not exclusively, the present disclosure relates to selectively double-locking one or more doors or a camper van based on a determined use of the camper van.

SUMMARY

Conventional vehicles configured to be used as domiciles, such as camper vans, currently have security systems that do not enable them to operate effectively as domiciles. For example, such vehicles may not equipped with, and therefore may not implement, a double-locking mechanism on one or more doors of the vehicle. More particularly, in order for vehicles being used as domiciles to allow for emergency egress from a locked vehicle, the doors of such vehicles should not be double-locked whilst the vehicle is occupied. However, as a result, such vehicles, which can be double the price of a regular passenger vehicle, such as a family car, is inevitably less secure against theft entry when unoccupied, parked and/or unattended.

Furthermore, vehicles configured to be used as domiciles are conventionally not equipped with alarm systems with interior motion detection sensors, as these can cause undesirable false alarms, for example, during the night, when the vehicle is being used as a domicile. This also results in the vehicle being more vulnerable to theft when unoccupied, parked and/or unattended.

The following disclosure seeks to address the aforementioned shortfalls of conventional vehicles that are configured to be and often used as domiciles. The present disclosure highlights the inclusion of one or more security modes for a vehicle configured to be used as a domicile, wherein security features can be selectively activated or deactivated for the vehicle depending on how the vehicle is being used and for what purpose, for example, being used as a domicile or as a passenger vehicle.

In accordance with a first aspect of the disclosure, a method of controlling a vehicle security system for a vehicle configured for habitation is provided, the method comprising selectively activating one of a first security mode and a second security mode, wherein the first security mode is configured to allow the vehicle to be used as a domicile.

Described herein is an enhancement to conventional security modes, such as reduced guard mode, wherein the alarm system can be tailored to allow interior coverage both in the cabin and in the living space, which would detect intrusion through open/broken windows, roof vents or cut/torn pop up roof units when the vehicle is left unattended.

When activating a security mode for use during habitation, the alarm sensors which may be triggered by motion inside the vehicle or movement, e.g., rocking or other movements caused by passengers or users within the vehicle, may be inhibited. The safeguard may also allow deployment of double-locking door latches to such vehicles because, when the first security mode is activated, double locking cannot be activated unless a different security mode is selectively activated, which enables the double-locking feature. Thus, the vehicle and the user can enjoy the same levels of security as a typical passenger car.

In some examples, the method comprises a step of determining a user interaction with the vehicle, a step of determining, based on the user interaction, whether the first security mode should be activated and a step of activating the first security mode, e.g., based on said determination.

In some examples, the first security mode is selectively activated based on an output of any one or more vehicle sensors, the one or more vehicle sensors comprising a least: a proximity sensor; an image sensor; and/or a heartbeat sensor.

In some examples, the first security mode is selectively activated based on a vehicle location and/or a user location.

In some examples, the method further comprises prompting the user to activate the first security mode.

In some examples, one of the first security mode and the second security mode is selectively activated following a predetermined period during which a user input is not received in response to the prompt.

In some examples, the first security mode comprises a plurality of user-customizable security features.

In some examples, activating the first security mode comprises activating a perimeter alarm of the vehicle without double locking a door of the vehicle, and activating the second security mode comprises double-locking a door of the vehicle.

In some examples, the method further comprises a step of determining whether the vehicle is being used as a domicile or as a passenger vehicle and a further step of selectively activating the first security mode upon determining that the vehicle is being used as a domicile.

According to a second aspect, a system is provided for controlling a vehicle security system for a vehicle configured for habitation, the system comprising means for selectively activating one of a first security mode and a second security mode, wherein the first security mode is configured to allow the vehicle to be used as a domicile.

According to a third aspect, vehicle configured for habitation is provided comprising the system according to the second aspect.

An automatic habitation mode may be best suited for camper vans, camper van conversions, or other vehicles configured to be used as domiciles, as it may reduce the number of variants of a vehicle produced, since the double locking feature need not be removed from the base vehicle, which would reduce manufacturing cost as the base vehicle may be used for all subsequent variants.

According to a further aspect, a non-transitory computer-readable medium having non-transitory computer readable instructions encoded thereon for controlling a vehicle security system comprising a plurality of security modes for a habitable vehicle, when executed by control circuitry, cause the control circuitry to implement the method according to the first aspect.

It shall be appreciated that other features, aspects and variations of the present disclosure will be apparent from the disclosure of the drawings and detailed description. Additionally, it will be further appreciated that additional or alternative embodiments of methods of and systems for controlling a vehicle security system may be implemented within the principles set out by the present disclosure.

FIGURES

The above and other objects and advantages of the disclosure will be apparent upon consideration of the following detailed description, taken in conjunction with the accompanying drawings, in which:

FIGS. 6C, 6D and 6E show examples of logic tests that may be used to automatically selectively activate one of the vehicle's security modes, in accordance with some examples of the disclosure;

The figures herein depict various examples of the disclosed disclosure for purposes of illustration only. It shall be appreciated that additional or alternative structures, systems and methods may be implemented within the principles set out by the present disclosure.

DETAILED DESCRIPTION

With reference to the Figures, systems and methods of controlling vehicle security will be described herein. Such systems and methods may be particular suited for implantation in camper vans, and/or any other type of vehicle adapted for at least temporary habitation.

Typically, camper vans have security systems designed to meet certain legislative requirements and allow emergency egress from a locked camper van. As such, it is common for camper vans not to be equipped with double locking systems so that occupants can easily escape the vehicle in an emergency. For example, if accidentally double-locked inside a camper vehicle, occupants would not be able to exit the vehicle quickly if there were a loss of vehicle battery power.

However, it is still desirable to be able to double lock an unattended camper van, and activate security features when occupying a camper van, e.g., at night, while maintaining safe egress from the vehicle during an emergency.

Proposed herein is a more secure vehicle configured to be used as a domicile having the security capabilities of a typical or high-end passenger car, and allowing for the functionalities associated with a camper van. More specifically, the solution proposes distinct vehicle security modes, for example, "habitation" mode, "transportation" mode, and "secure" mode, each having different security capabilities when activated, for example, i) single locked and disarmed, ii) double locked and partially armed, and iii) double locked and fully armed.

In some examples; a security system of a vehicle configured to be used as a domicile may be capable of activating a plurality of security modes. For example, a first security mode may be a security mode suitable for habitation purposes, e.g., habitation mode (or primary mode). A second security mode may be a reduced guard mode (or secondary mode), for example, and a third security mode may be a full guard mode (or tertiary mode), for example. In some embodiments, other security modes or a combination of security modes may also be selectively activated depending on the vehicle's security system.

In some examples, activating the first security mode comprises activating a perimeter alarm of the vehicle without double locking a door of the vehicle, and activating the second security mode comprises double-locking a door of the vehicle. In some examples, features that may be activated/deactivated, or enabled/disabled, may include, but is not limited to, double locking, alarm system (e.g., motion sensors, proximity sensors, etc.), inhibited engine crank, onboard water pump, onboard lighting, gas appliances, external BBQ point, park brake release, and/or one or more power sockets.

Figure 1:
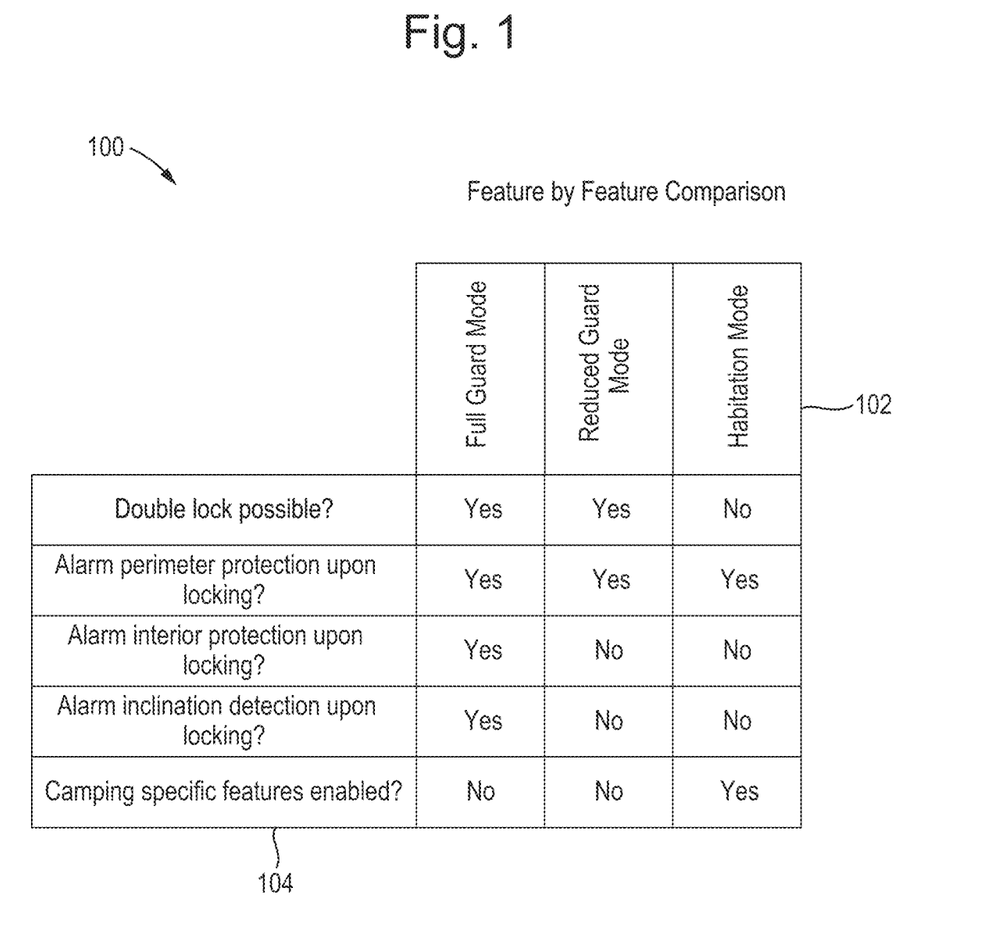
FIG. 1 shows a matrix of three security modes and their feature by feature comparisons.

FIG. 1 shows a matrix of three distinct security modes and a comparison of their features. In one example, as depicted in FIG. 1, full guard mode may include, for example, as often seen in conventional vehicles, double locking, alarm perimeter protection upon locking, alarm interior protection upon locking, and alarm inclination detection upon locking. Reduced guard mode may include, for example, double locking and alarm perimeter protection upon locking but disable alarm interior protection upon locking, and alarm inclination detection upon locking. Habitation mode may include and enable, for example, alarm perimeter protection upon locking and other camping specific features whilst disabling other security features that are typically enabled when other security modes are activated, such as doubling locking, alarm interior protection upon locking, and alarm inclination detection upon locking.

It will be appreciated that the aforementioned security modes and security features are not limiting and may include one or more security features best suited for vehicle usage, for example, depending on whether a vehicle configured to be habitable is being used as a domicile or a passenger vehicle. Furthermore, the primary security mode, e.g., habitation mode, may also be personalized based on user preferences and/or have user-customizable security features. Thus, unlike conventional security systems, which are typically limited to full guard and reduced guard modes, for example, the security system described herein can provide a more effective combination of security features tailored to an individual's needs and therefore provides an enhanced user experience when it comes to vehicle security.

Figure 2A:
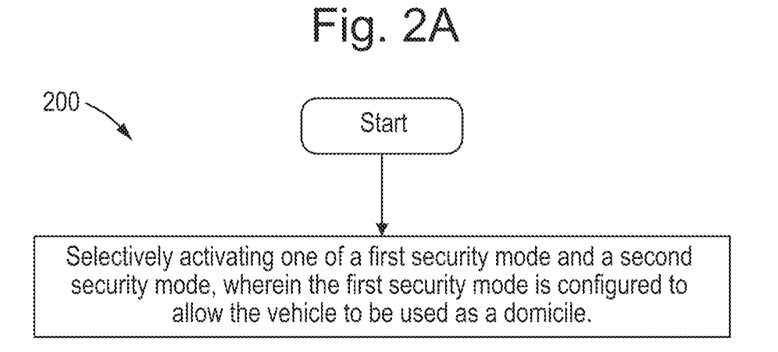
FIGS. 2A and 2B show example flowcharts of selectively activating a security mode, in accordance with some examples of the disclosure.
Figure 2B:
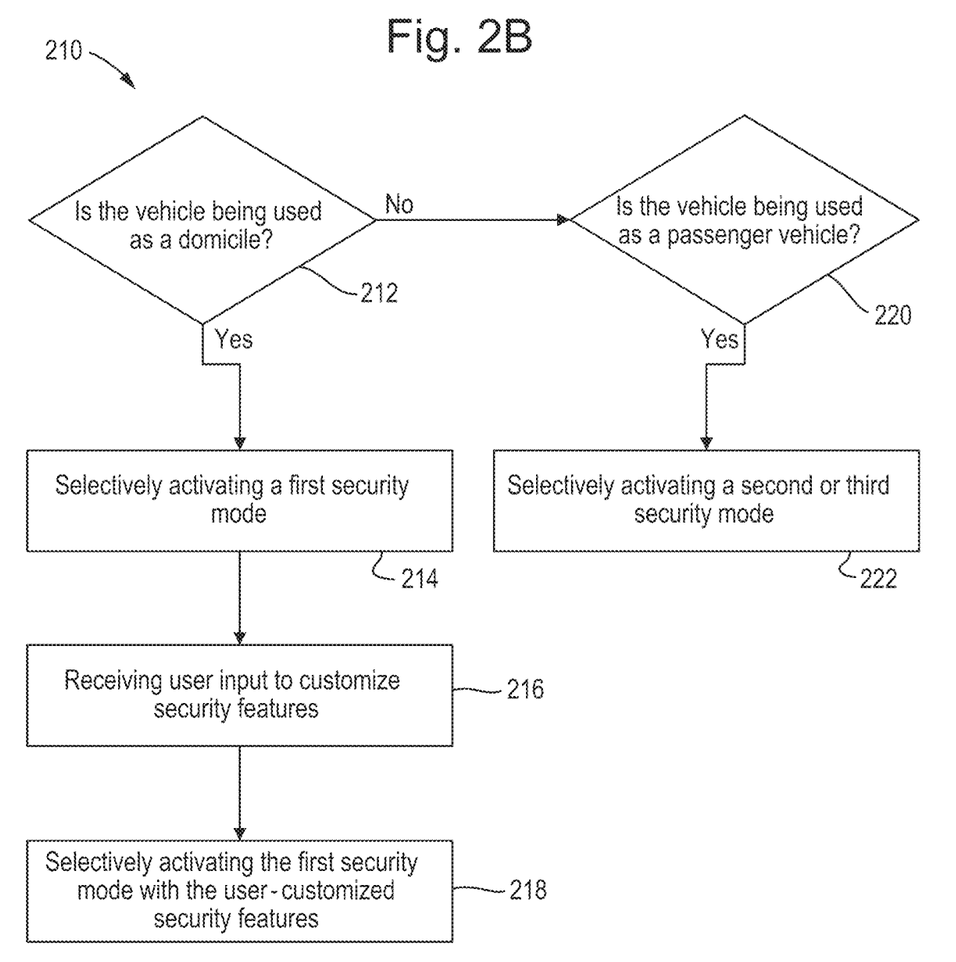

FIGS. 2A and 2B will now be described, which show example flowcharts of selectively activating a security mode, in accordance with some examples of the disclosure.

As shown in FIG. 2A, one of a first security mode and a second security mode is selectively activated, wherein the first security mode is configured to allow the vehicle to be used as a domicile. In some examples, a different security mode for example, a second security mode such as a reduced guard mode, may be selectively activated upon determining that the vehicle is being used as a passenger vehicle, for example. Thus, in some examples, different security modes may be activated appropriately based on a determination of vehicle usage.

For example, as shown in FIG. 2B, at step 212, it may be determined whether the vehicle is being used as a domicile. Upon determining that the vehicle is being used as a domicile, at step 214, a first security mode may be selectively activated. In some examples, at step 216, the user may input using a user interface, for example, a user device such as a mobile phone or a vehicle dashboard, one or more customizations to the first security mode. In turn, at step 218, the first security mode having the user-customized security features can be selectively activated.

Following a step of determining that the vehicle is not being used as a domicile, at step 220, it may be determined that the vehicle is being used as a passenger vehicle. Upon determining that the vehicle is being used as a passenger vehicle, at step 222, a second security mode or third security mode may be selectively activated, thus implementing the most appropriate security settings for the vehicle based on vehicle usage by the user.

In order to determine whether a specific vehicle security mode should be activated, such as a security mode suitable for when the vehicle is being used as a domicile, one or more user interactions may be determined between the user, e.g., a driver and/or one or more occupants of the vehicle, and the vehicle. In some examples, one or more vehicle sensors may be used to determine whether the vehicle is being used as a domicile or as a passenger vehicle.

For example, user interactions may be determined based on the use of one or more vehicle accessories or one or more vehicle appliances. For example, the use of the vehicle's gas appliances may be a strong indicator that a user is occupying the vehicle as a domicile. In another example, the use of one or more 240V power sockets may also be an indicator that the user is using the vehicle as a domicile. In yet a further example, the vehicle may come to an end of a driving event and, upon determining that the none vehicle doors have not been opened after a pre-determined period after the end of the driving event (e.g., no egress takes place), it may be determined that the passengers or occupants of the vehicle are currently using the vehicle as a domicile and, thus, require the security settings to activate a security mode dedicated for vehicle habitation. For example, a lock command may be activated by the vehicle's security system.

In some examples, a security mode suitable for when the vehicle is being used as a domicile (e.g., habitation mode) may be automatically activated when the vehicle is attached to a mains electricity hookup. This would disable engine cranking and render the drive torque to be unavailable during this time such that the vehicle cannot be driven away with the mains cable connected. However, in some examples, habitation mode may be overridden, e.g., if the vehicle is connected to a mains cable at home prior to a road trip to precondition the refrigerator/freezer or to charge the 12V onboard leisure power batteries. Such configurations may be customizable by the user, e.g., using the dashboard of the vehicle or by a mobile application on a user device, using a series of logic operators upon receipt of a locking request. The series of logic operators may include, but is not limited to, e.g., determining GPS location, 240V mains connected/disconnected, occupancy of the vehicle and/or fob/user device within close proximity to the vehicle.

In some examples, a security mode suitable for when the vehicle is being used as a domicile (e.g., habitation mode) may be automatically activated when one or more gas appliances connected to or within the vehicle are being used. In some examples, if the vehicle is not in habitation mode, it may be possible to inhibit the use of gas appliances through controlling electrical solenoid valves within the onboard gas system and also by measuring the gas system input pressure to ensure any onboard gas bottles have been turned off. In this way, the user may learn to always select the appropriate security mode for the use case of the vehicle accordingly. This can also result in the vehicle's security system to learn about the user's usage habits of the vehicle and, therefore, may accurately determine whether to automatically activate certain security modes or security settings or update logic operators accordingly.

In some examples, a security mode suitable for when the vehicle is being used as a domicile (e.g., habitation mode) may be automatically activated upon determining that the vehicle arrives at a location that is pre-set as "home", for example. In some examples, double locking may be requested upon determining that the GPS location matches with the user's home address and upon further determining that occupants have vacated the vehicle upon arrival at the home address. In some examples, the default mode can be configured such that full guard mode is achieved, enabling full alarm coverage of the vehicle and double locking to take place.

In some examples, a security mode suitable for when the vehicle is being used as a domicile (e.g., habitation mode) may be automatically activated upon detecting an attempt to disconnect the 240V mains whilst the vehicle is in full guard security mode or any other security mode other than habitation mode, for example. Such cases may be an attempt of a criminal act by a third party trying to force the vehicle out of pre-set security modes in order to reduce the security protection of the vehicle for safer ingress, for example. Thus, such logic operators may be implemented to restrict theft and other criminal acts. In such cases, in some examples, the vehicle's security system may sound an alarm, e.g. anti-theft alarm, or warn, via notification, the user or owner of the vehicle.

In some examples, in order to determine whether a specific vehicle security mode should be activated, such as a security mode suitable for when the vehicle is being used as a domicile (e.g., habitation mode), a user or vehicle location may be determined. In one example, the vehicle's location may be cross-checked with a user's calendar showing that the vehicle is at a campsite during the user's vacation. In another example, the user's location may be determined using a location tracker on a user's device. Additionally or alternatively, the user's location may be determined using one or more 2D or 3D sensors. For example, user location may indicate a user position within the vehicle, e.g., in the kitchen area, and/or a location of the user with respect to the vehicle, e.g., located a distance away from a parked vehicle, and/or a geographical location of the user and/or vehicle.

In some examples, upon determining that the vehicle is situated at a known campsite, e.g., based on GPS location, the default security setting may be set to a security mode suitable for when the vehicle is being used as a domicile. In some examples, the vehicle may be forced out of this security mode either manually, e.g., by pressing a button or control panel such as a touchscreen within the vehicle configured for activating/deactivating security settings, or automatically, e.g., using a combination of visual sensors and/or other sensors such as a heartbeat sensor, to verify that there are no living beings remaining within the vehicle upon locking. In some examples, if an occupant is detected within a short timeframe, e.g., less than 1 minute, after automatically activating a double locking mechanism, the vehicle may further automatically revert to a central lock such that egress from the interior of the vehicle is possible using the interior door release mechanisms.

Habitation mode may also be overridden manually by the user, e.g., using a fob key or the user's device (e.g., using a mobile application) when the fob/user device is within visual range of the vehicle. The user may verify that occupants are remaining within the vehicle. It will be appreciated that other logic operators may be used to determine whether the automatic double locking or activation/deactivation of vehicle security features should be reverted or maintained, for example.

In some examples, the use of vehicle ignition whilst in habitation mode may require the user to override habitation mode to verify that it is safe to start the vehicle. For example, the user may be required to unplug the mains connected to the vehicle. Additionally, the user may be required to interact with the vehicle security settings menu or press a specific key fob button, interact with a mobile phone application, or input a PIN code similar to exiting a "valet mode" in conventional systems. Such triggers may be customizable by the user to determine a suitable safety protection level for the user's specific use and enhanced user experience with a smart security system. Users with young children may benefit from preventing accidental ignition-on events as keys are likely to be within the vehicle/domicile area.

In some examples, when in habitation mode, for example, the vehicle may utilize external sensors such as parking sensors, side object detection sensors and one or more external cameras to detect potential outside threats to the vehicle. This can be advantageous when the vehicle is parked at night for enhanced personal safety of occupants within the vehicle when using the vehicle as a domicile.

It will be appreciated that various outputs and logic operators may be controlled and used to determine the most appropriate security mode or settings, and can be an extension of the vehicle's base onboard control systems such as a body control module or control unit, e.g., by means of an additional module specifically to camper vehicles and upfitted vehicles. By outputting various CAN (or equivalent) messages, interactions with the base vehicle's security settings may determine each security mode's allowed functions and direct DC current to drive gas or water solenoids and may inhibit or enable gas water appliances and mains power sockets, for example.

Figure 3:
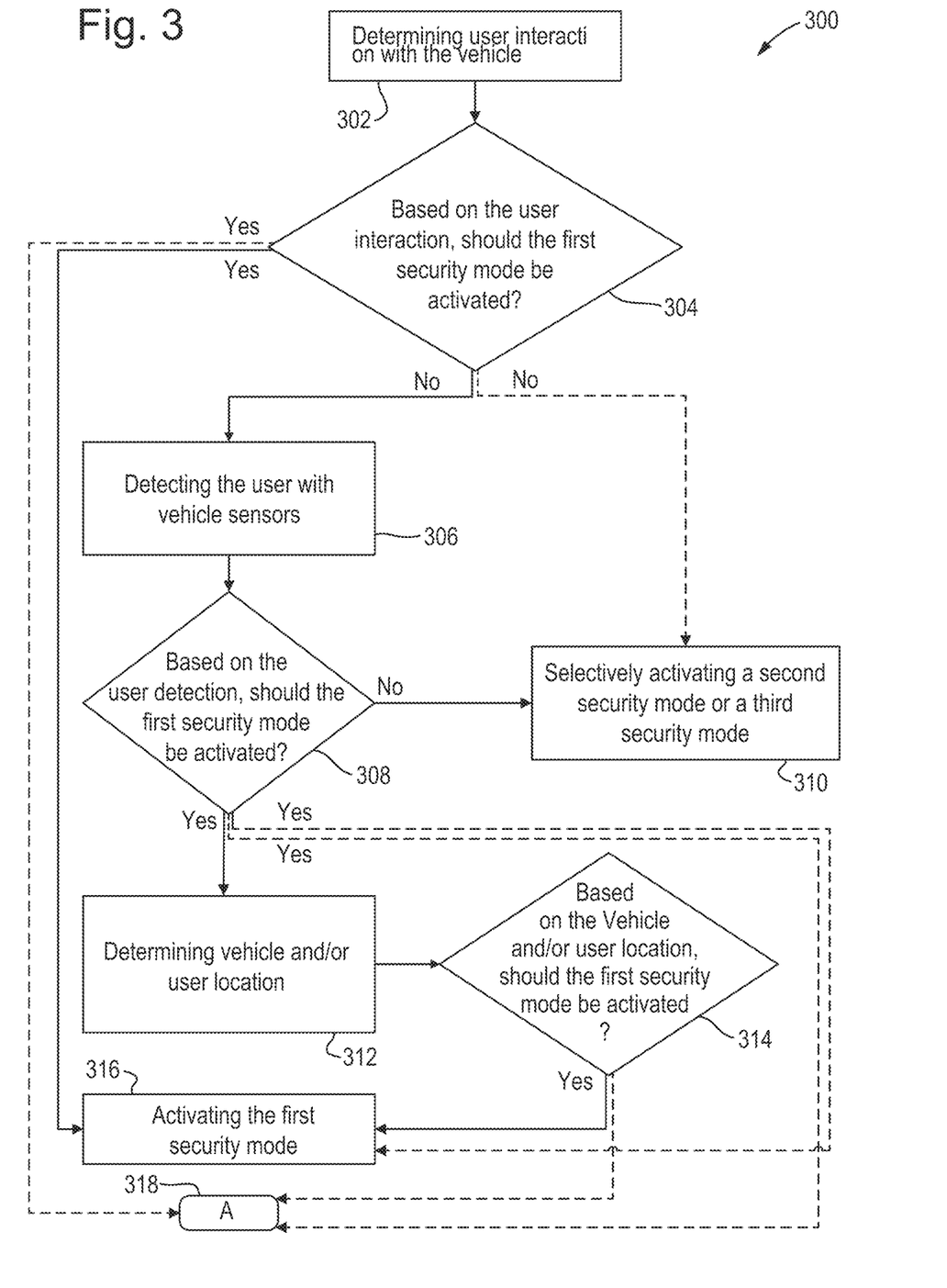
FIG. 3 illustrates an example flowchart of a vehicle security system control method, in accordance with some examples of the disclosure.

FIG. 3 will now be described, which illustrates an example flowchart of a vehicle security system control method, in accordance with some examples of the disclosure.

At step 302, a user interaction with the vehicle is determined. For example, the user interaction may be determined based on user interaction with one or more vehicle components and/or devices connected to the vehicle. For example, vehicle components and/or devices may include accessories that form part of the vehicle, such as a vehicle door, window, park brake release, water pump, any lighting, internal gas appliances, power sockets and/or an external BBQ point. Additionally, or alternatively, the user interaction may be determined based on user interaction with an OEM vehicle connectivity application, for example, via a user device such as a mobile device.

At step 304, based on the user interaction, it is determined whether the first security mode be activated. Upon determining that the first security mode should be activated, the first security mode may be automatically activated, as shown at step 316. Optionally, as shown at step 318, the first security mode may be selected to be activated, however, in order to activate the security mode, user input may be required. Thus, providing a semi-automated security system.

Upon determining that the first security mode should not be activated, user occupancy in the vehicle or user proximity to the vehicle may be detected using one or more vehicle sensors, as shown as step 306. Based on the user detection, it may be determined whether the first security mode should be activated. Upon determining that the first security mode should not be activated, a second or a third security mode, suitable for other usages of the vehicle, may be selectively activated accordingly, as shown at step 310 in FIG. 3.

Upon determining that the the first security mode should not be activated based on the user interaction, optionally, the control strategy may determine to selectively activate the second or the third security mode, suitable for other usages of the vehicle.

Upon determining that the first security mode should be activated based on the user detection, as shown as step 312, the vehicle's location and/or the location of the user may be further determined. Based on the vehicle and/or user location, it may be determined whether the first security mode should be activated, as shown at step 314. Upon determining that the first security mode should be activated, the first security mode may be automatically activated, as shown as step 316. Optionally, as shown as 318, the first security mode may be selected to be activated, however, in order to activate the security mode, user input may be required, leading to a semi-automated security mode activation process, which will be described with respect to FIG. 4 below.

Optionally, the first security mode may be automatically selectively activated based on an output of any one or more vehicle sensors. In some examples, automatic selection of security modes may be achieved by a series of logic input or checks using an array of possible sensing and/or detection devices including, but not limited to, gas pressure transducers, the use of electrical appliances, and other vehicle accessories or devices.

For example, gas pressure transducers may detect that onboard gas bottles have been turned off and the line system pressure is evacuated to the atmosphere, thus allowing for safe use of the vehicle as a passenger vehicle to determine that normal driving mode is possible. In this example, cranking/torque would not be inhibited to allow the user to use the vehicle as a passenger vehicle. In another example, the gas pressure transducer indicating line pressure (bottle connected and ON) may force automatic activation of habitation mode if the selectively activated security mode has not yet been selected by the user already upon a lock command or request, for example. In this example, cranking/torque may be inhibited.

In some examples, when the vehicle is not in habitation mode, or other security mode dedicated for domicile use of the vehicle, camper specific features may be inhibited. Camper specific features may include, but is not limited to, gas, other fuel and heavy current electrical appliances. These camper features may include, for example, a cooker, fridge, external BBQ point, onboard water heater, onboard water pump, onboard living space heater, etc. Further features that may be inhibited may include mains water heating and fridge, unless overridden in pre-drive event conditioning mode or user enabled full guard security mode whilst leaving the vehicle unattended as domicile on a camping site, for example.

For example, an interior image sensor may be used to detect motion and passengers of the vehicle. More particularly, in some examples, a depth-perception camera may be used to capture image frames of the vehicle's interior and identify, for example, the number of passengers in the vehicle and each passenger's positioning within the vehicle in order to understand how the vehicle is being used. Other sensors may include, for example, a heartbeat sensor or other sensors used to detect micro-vibrations.

Interior motion sensors may be used in connection with an anti-theft alarm and may additionally be used in conjunction with a heartbeat sensor, visual sensors and other detection sensors to determine that there are occupants within spaces dedicated for usage as a domicile as part of the vehicle. If one or any combination of sensors output data that indicates that occupants are within such living spaces at the time double locking of the vehicle is requested, e.g., requested accidentally, then habitation mode may be invoked. In some examples, a series of "mislock chirps" of the vehicle horn/alarm may be signaled to warn the user that the vehicle has locked or not locked in the manner in which they commanded. This can be an extension of the existing mislock chirps warning of a door ajar when requesting a vehicle lock event, for example. Should sensors determine movement of occupants within a short timeframe, e.g., within 60 seconds, of a double lock event, habitation mode may be activated and the vehicle may release the double locking mechanism to revert the vehicle to a centrally locked configuration to allow for emergency egress, for example.

Vehicle sensors or security sensors for the vehicle may include, but is not limited to, for example, a proximity sensor, an image sensor, and/or a heartbeat sensor. In one example, with the aid of live camera viewing and/or a heartbeat sensor, it may be determined that the user is not occupying the vehicle, but the first security mode is currently activated. Based on the vehicle sensor data, the security system may remote revocation of the first security mode and activate automatically or semi-automatically full security settings for the vehicle. Other 2D and 3D interior and exterior sensors may be integrated with the vehicle's security system, which may be used to detect passenger movements, positioning within the vehicle, and activities.

Further optionally, the first security mode may be semi-automatically activated, based on user input. In relation to a semi-automated process, FIG. 4 will now be described, which illustrates an extended example flowchart of the vehicle security system control method of FIG. 3 with respect to prompting a user to activate a security mode, in accordance with some examples of the disclosure.

Figure 4:
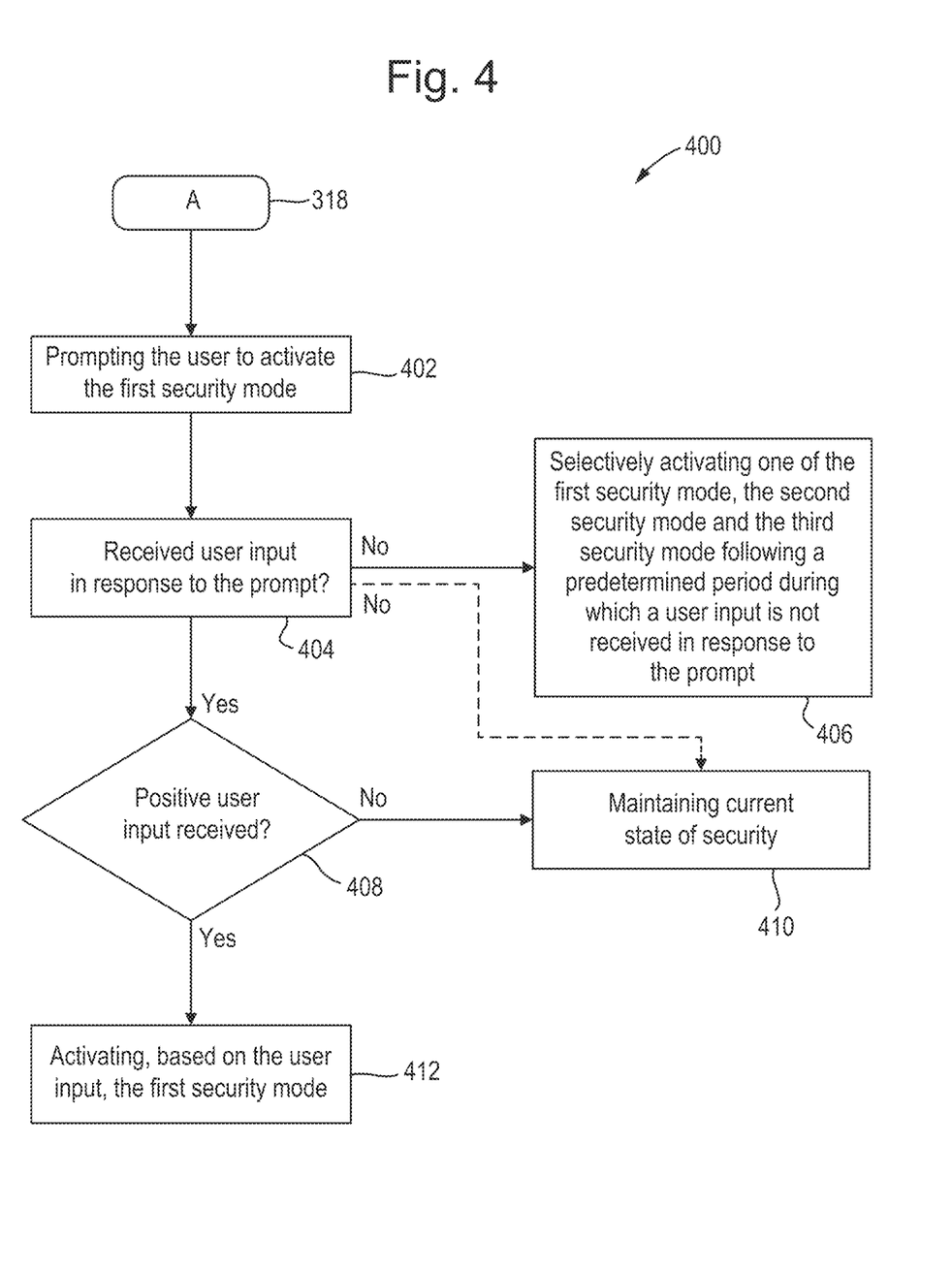
FIG. 4 illustrates an extended example flowchart of the vehicle security system control method of FIG. 3, in accordance with some examples of the disclosure.

At step 318, the first security mode may be selected to be activated, however, in order to activate the security mode, a user input may be required. At step 402, the security system prompts the user to activate the first security mode. At step 404, it is determined whether a user input is received in response to the prompt from the security system to the user. In some arrangements, different security modes may be selectively activated by the user selecting their desired security mode from a menu on a dashboard or other vehicle settings in a similar fashion to how a full guard mode security setting is selected conventionally.

Upon determining that the user input is not received or, for example, not received for a predetermined duration, one of the first security mode, the second security mode and/or the third security mode, or any other combination of security modes is selectively activated, as shown as in step 406. For example, any one of the security modes may be predetermined to be a default security mode in case a user input is delayed or not received. Optionally, as shown as step 410, the current state of security, e.g., the current state of the security system or a current security mode, may be maintained.

Upon determining that the user input is received, it is further determined, as shown as step 408 in FIG. 4, whether the user input is a positive user input with respect to the prompt to the user to activate the first security mode. Upon determining that a negative user input is received, the current state of security, e.g., the current state of the security system or a current security mode, may be maintained. Alternatively, upon determining that a positive user input is received in response to the prompt, the first security mode may be activated, as shown as step 412 in FIG. 4.

Figure 5:
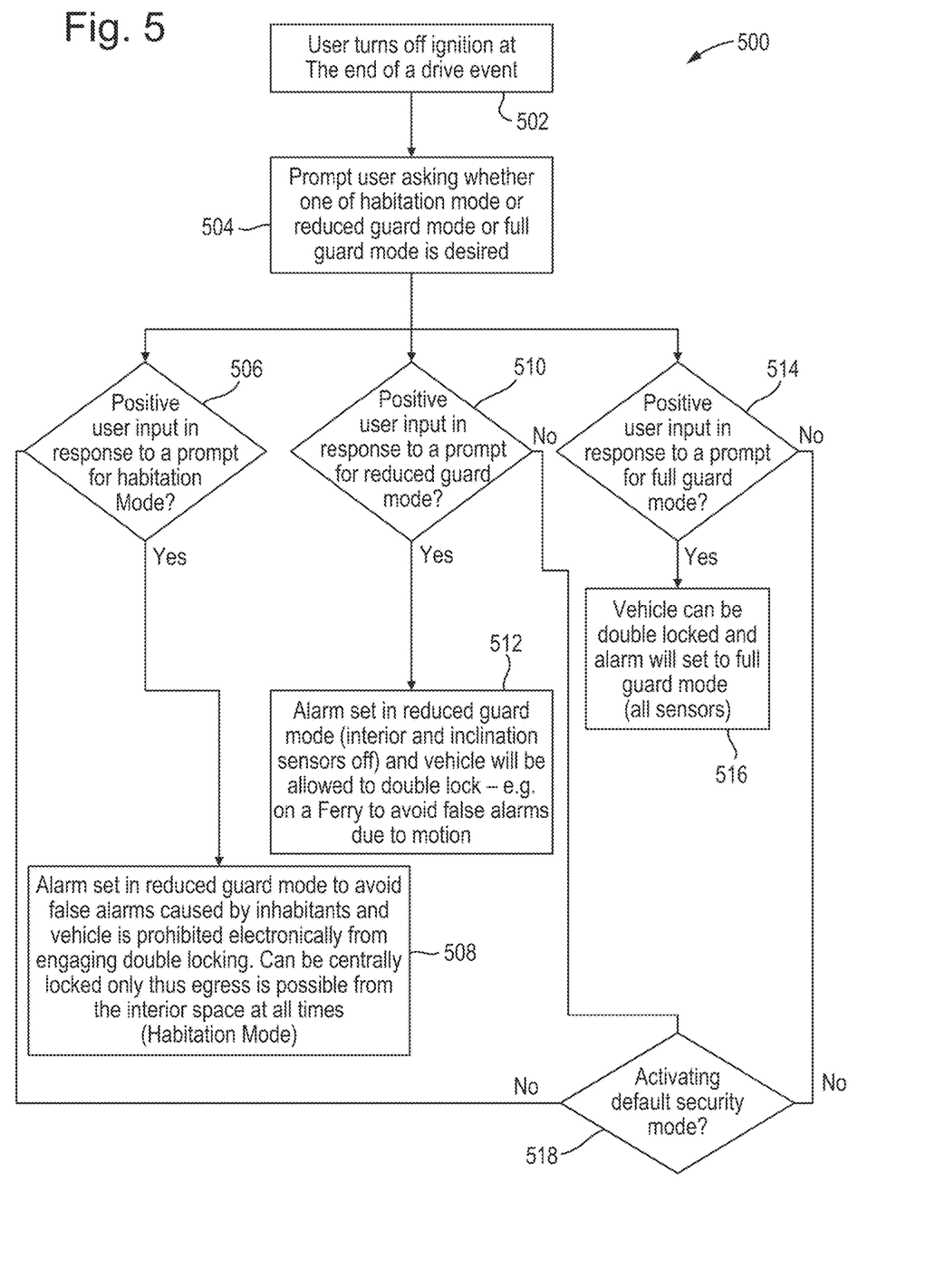
FIG. 5 illustrates a further example flowchart of a vehicle security system control method with respect to activating a security mode based on user input in response to a prompt, in accordance with some examples of the disclosure.

FIG. 5 will now be described, which illustrates a further example flowchart of a vehicle security system control method with respect to activating a security mode based on user input in response to a prompt, in accordance with some examples of the disclosure.

At step 502, a control unit acknowledges that a user has turned off the ignition at the end of a drive event.

At step 504, a prompt is transmitted to the user, for example via a user device connected wirelessly to the vehicle or a vehicle dashboard, providing the prompt, for example, a pop-up, asking whether one of steps 506, 510 or 514 is desired, i.e., habitation mode, reduced guard mode or full guard mode respectively. It will be appreciated that any other security mode having a combination of activated/deactivated, enabled/disabled, security features may be possible in line with the teachings presented herein.

As shown at step 506, it may be determined whether a positive user input is provided in response to a prompt for habitation Mode. Upon determining that a positive response is received, as shown at step 508, the alarm system may be set in reduced guard mode to avoid false alarms caused by inhabitants of the vehicle and the vehicle may be prohibited electronically from engaging double locking. In habitation mode, for example, the vehicle may only be centrally locked, thus allowing egress from the interior of the vehicle at all times, and therefore providing a security mode that is improved over conventional security modes when the vehicle is being used as a domicile.

As shown at step 510, it may be determined whether a positive user input is provided in response to a prompt for reduced guard mode. Upon determining that a positive response is received, as shown at step 512, the alarm system may be set in reduced guard mode, thus disabling the interior and inclination sensors of the vehicle, and the vehicle may be allowed to double lock. In one example implementation, reduced guard mode, or any security mode having similar security features, may be appropriate on a ferry where it may be desirable to avoid false alarms due to motion within the vehicle.

As shown at step 514, it may be determined whether a positive user input is provided in response to a prompt for full guard mode. Upon determining that a positive response is received, as shown at step 516, the vehicle may be double-locked and the alarm may be set to full guard mode, which may enable all sensors and alarms of the vehicle security system, for example.

Alternatively, if a positive input is not received from the user in response to the prompt asking the user whether one of the security modes is desired and should be activated, a default security mode may be activates, as shown at step 518. For example, a user may have timed out in providing his/her response to the prompt. In other examples, the user may simply ignore the prompt or the user may not be aware that the prompt has arrived and requires the user's attention. In such cases, the default security mode may be activated. For example, the default security mode may be preset. Alternatively, the default security mode may refer to the security mode for which the prompt had indicated.

Figure 6A:
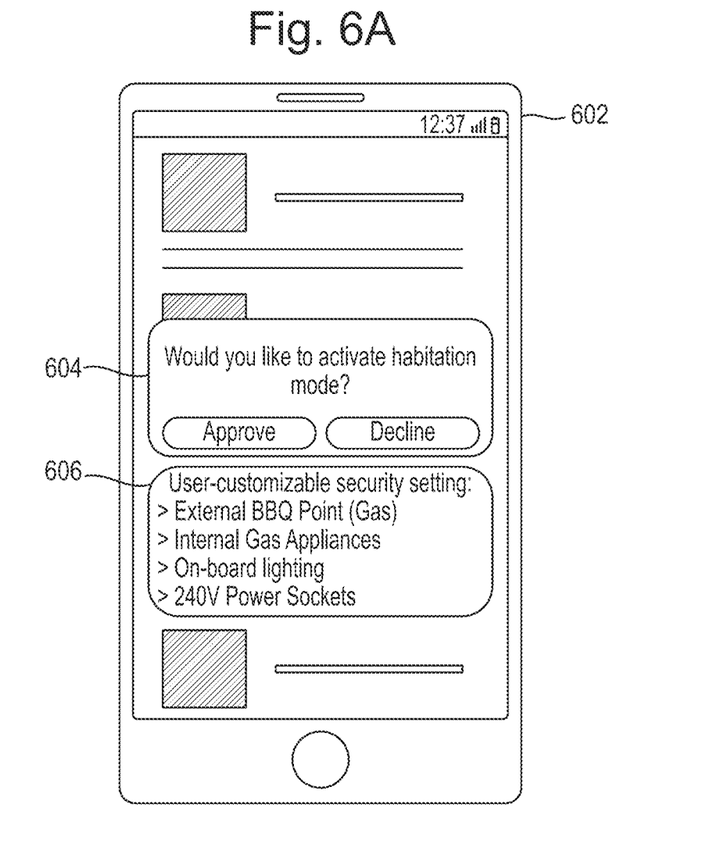
FIGS. 6A and 6B show example user interfaces displaying a prompt to activate one of a plurality of vehicle security modes, in accordance with some examples of the disclosure.
Figure 6B:
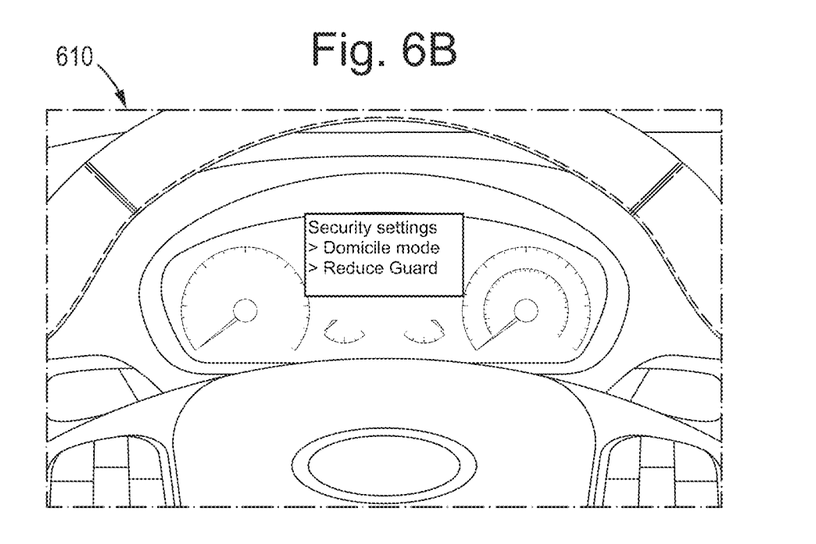

FIGS. 6A and 6B show example user interfaces displaying a prompt to activate one of a plurality of vehicle security modes, in accordance with some examples of the disclosure.

FIG. 6A, user device, for example, a user mobile phone 602 connected to the vehicle via a wireless connection. When a prompt, for example, a pop-up notification requesting user input as shown as 604 in FIG. 6A, is transmitted to the user, the user may receive the prompt at user device connected wirelessly to the vehicle. For example, the prompt may ask the user whether one of a first, second or third security mode should be activated. In some examples, the user may also be able to customize the security features of the security mode that is suited for when the vehicle is being used as a domicile using user-customizable security settings 606. In another example, the user may receive the prompt using the vehicle's dashboard 610, as shown in FIG. 6B, for example, in the form of a settings menu wherein the user can navigate and activate the different security settings as needed.

The various security modes described herein may be activated/deactivated using connected vehicle services/mobile device as key systems such that, for example, any user who has parked their vehicle could get a warning on their device that the vehicle is in habitation mode when they walk away from the vehicle, thus giving the user the option to remotely take it out of habitation mode and enable double locking or activate the vehicle's alarm sensors.

FIGS. 6C, 6D and 6E show examples of logic tests that may be used to determine a suitable automated security mode or setting and for the selective activation of the suitable security mode. For example, such logic tests and checks may be implemented upon determining that the user has not manually selected a security mode upon turning the ignition off following a drive event. It will be appreciated that other logic tests could be further included and implemented for other sensors and scenarios and the skilled person shall appreciate the application of logic tests and checks for the integration of additional technologies and accessories to the vehicle.

In some examples, it may not be clear whether habitation mode should be activated or deactivated in a given scenario. In some examples, a confidence level may be determined for whether one of the security modes should be selectively activated, automatically or manually, or deactivated for normal driving mode, for example. The confidence level may be used to make a decision by the vehicle's security system. For example, above 85% confidence may indicate the security system to automatically activate habitation mode, between 35% and 85% may indicate the security system to prompt the user for a semi-automated process, and below 35% may indicate the security system to maintain the current/default security settings or apply no change to the security settings of the vehicle.

Figure 7:
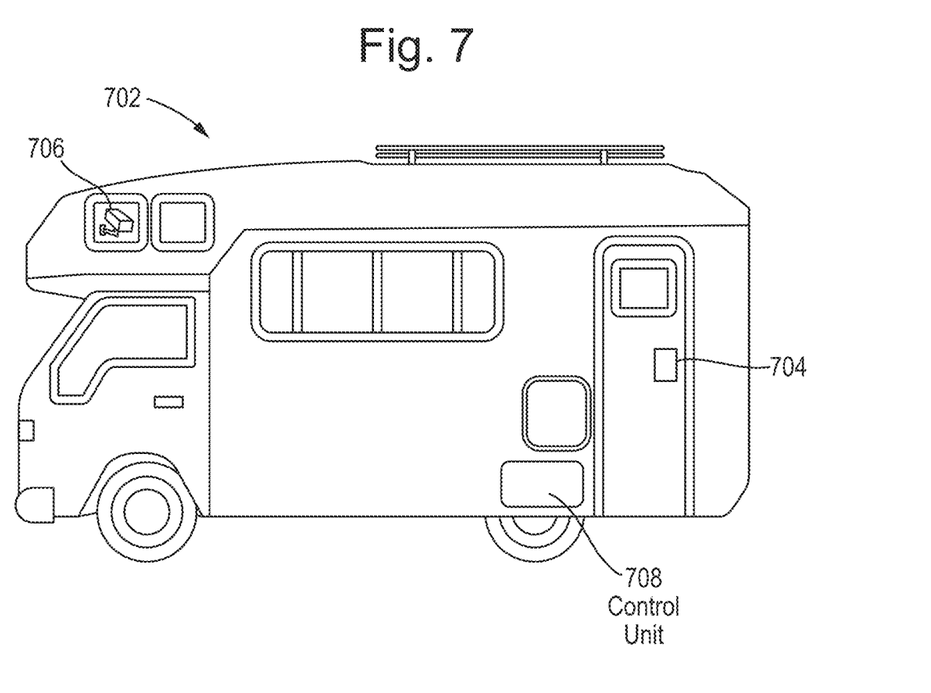
FIG. 7 shows an example vehicle that may be used as a domicile, in accordance with some examples of the disclosure.

FIG. 7 shows an example vehicle that may be used as a domicile, in accordance with some examples of the disclosure.

FIG. 7 shows a vehicle, such as a camper van 702, comprises a security control unit 708, in accordance with some examples of the present disclosure. In the example shown in FIG. 7, the vehicle 702 comprises a door with a double locking mechanism 704, which may be enabled or disabled, one or more vehicle sensors 706 configured to detect user movement or determined that the vehicle is occupied, for example, and a control unit 708.

In the example of FIG. 7, the control unit 708 may be in operable communication with the vehicle sensor 706 and the double locking mechanism 704, or any other security feature, for example, by virtue of a vehicle security module. Control unit 610 is configured to carry out one or more of the above disclosed methods to control the vehicle's security system, as described above.

In the arrangement shown in FIG. 7, the controller unit may control a vehicle security system for a vehicle configured for habitation, the method comprising selectively activating one of a first security mode and a second security mode, wherein the first security mode is configured to allow the vehicle to be used as a domicile.

Figure 8:
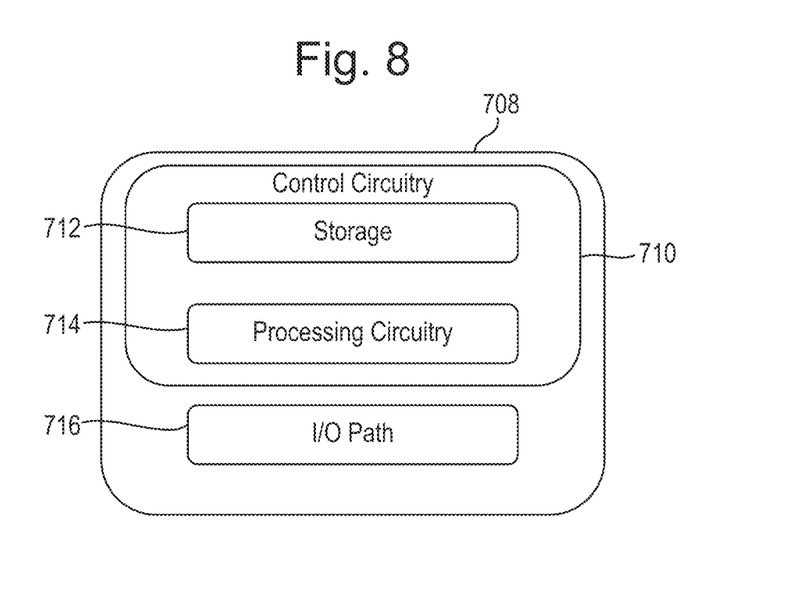
FIG. 8 shows an exemplary block diagram of a control unit.

FIG. 8 shows an exemplary block diagram of control unit 708. Control unit 708 includes control circuitry 710, storage 712, processing circuitry 714 and I/O path 716. Control unit 708 may be based on any suitable control and processing circuitry.

Control circuitry 710 may be based on any suitable processing circuitry such as processing circuitry 714. In some embodiments, control circuitry 710 executes instructions for controlling a vehicle security system for a vehicle configured for habitation stored in memory, e.g., storage 714) Specifically, control circuitry 710 may be instructed by the security system to perform the methods described herein.

As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, e.g., processing circuitry may be distributed across multiple separate processors, multiple of the same type of processors (e.g., two Intel Core i9 processors) or multiple different processors (e.g., an Intel Core i7 processor and an Intel Core i9 processor).

Storage 712, and/or storages of other components of security control system may be an electronic storage device. As referred to herein, the phrase "electronic storage device" or "storage device" should be understood to mean any device for storing electronic data, computer software, or firmware, such as random-access memory, read-only memory, hard drives, and the like, and/or any combination of the same. In some examples, control unit 708 executes instructions for an application stored in memory (e.g., storage 712). Specifically, control unit 708 may be instructed by an application to perform the methods/functions discussed herein.

The control unit 708 may be configured to transmit and/or receive data via I/O path 716. For instance, I/O path 716 may include a communication port(s) configured to transmit and/or receive data from at least one of an engine control module, an actuator control module and a vehicular system control module, such as an exhaust system control module.

This disclosure is made for the purpose of illustrating the general principles of the systems and processes discussed above and are intended to be illustrative rather than limiting. More generally, the above description is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it will be appreciated that the disclosure is not limited hereto and that particular combinations of the various features described and defined in any aspects can be implemented and/or supplied and/or used independently. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

The invention claimed is:

1. A method of controlling a vehicle security system for a vehicle configured for habitation, the method comprising selectively activating one of a first security mode and a second security mode, wherein the first security mode is configured to allow the vehicle to be used as a domicile, and wherein activating the first security mode comprises activating a perimeter alarm of the vehicle without double locking a door of the vehicle, and activating the second security mode comprises double-locking a door of the vehicle.

2. The method of claim 1, the method comprising:
   determining a user interaction with the vehicle;
   determining, based on the user interaction, whether the first security mode should be activated; and
   activating the first security mode.

3. The method of claim 1, wherein the first security mode is selectively activated based on an output of any one or more vehicle sensors, the one or more vehicle sensors comprising: a proximity sensor; an image sensor; and/or a heartbeat sensor.

4. The method of claim 1, wherein the first security mode is selectively activated based on a vehicle location and/or a user location.

5. The method of claim 1, wherein the method further comprises prompting the user to activate the first security mode.

6. The method of claim 5, wherein one of the first security mode and the second security mode is selectively activated following a predetermined period during which a user input is not received in response to the prompt.

7. The method of claim 1, wherein the first security mode comprises a plurality of user-customizable security features.

8. The method of claim 1, wherein the method further comprises:
   determining whether the vehicle is being used as a domicile or as a passenger vehicle; and
   selectively activating the first security mode upon determining that the vehicle is being used as a domicile.

9. A system for controlling a vehicle security system for a vehicle configured for habitation, the system comprising means for selectively activating one of a first security mode and a second security mode, wherein the first security mode is configured to allow the vehicle to be used as a domicile, wherein the means for activating the first security mode comprises means for activating a perimeter alarm of the vehicle without double locking a door of the vehicle, and activating the second security mode comprises double-locking a door of the vehicle.

10. The system of claim 9, the system comprising:
    means for determining a user interaction with the vehicle;
    means for determining, based on the user interaction, whether the first security mode should be activated; and
    means for activating the first security mode.

11. The system of claim 9, wherein the first security mode is selectively activated based on an output of any one or more vehicle sensors, the one or more vehicle sensors comprising: a proximity sensor; an image sensor; and/or a heartbeat sensor.

12. The system of claim 9, wherein the first security mode is selectively activated based on a vehicle location and/or a user location.

13. The system of claim 9, wherein the system further comprises means for prompting the user to activate the first security mode.

14. The system of claim 13, wherein one of the first security mode and the second security mode is selectively activated following a predetermined period during which a user input is not received in response to the prompt.

15. The system of claim 9, wherein the first security mode comprises a plurality of user-customizable security features.

16. The system of claim 9, wherein the system further comprises:
    means for determining whether the vehicle is being used as a domicile or as a passenger vehicle; and
    means for selectively activating the first security mode upon determining that the vehicle is being used as a domicile.

17. A vehicle configured for habitation comprising the system of claim 9.

18. A non-transitory computer-readable medium having non-transitory computer-readable instructions encoded thereon for controlling a vehicle security system comprising a plurality of security modes for a habitable vehicle, when executed by control circuitry, cause the control circuitry to implement the method of claim 1.

* * * * *